United States Patent
Nakatsuka

(10) Patent No.: US 10,198,617 B2
(45) Date of Patent: Feb. 5, 2019

(54) IMAGE-ACQUISITION APPARATUS

(71) Applicant: OLYMPUS CORPORATION, Tokyo (JP)

(72) Inventor: Masayuki Nakatsuka, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 28 days.

(21) Appl. No.: 15/591,609

(22) Filed: May 10, 2017

(65) Prior Publication Data
US 2017/0330019 A1  Nov. 16, 2017

(30) Foreign Application Priority Data

May 13, 2016  (JP) ................................ 2016-096660

(51) Int. Cl.
G06K 9/00 (2006.01)
G06T 7/00 (2017.01)
(Continued)

(52) U.S. Cl.
CPC ......... *G06K 9/0014* (2013.01); *G02B 21/367* (2013.01); *G06K 9/00134* (2013.01);
(Continued)

(58) Field of Classification Search
CPC ..... G06K 9/0014; G06T 7/248; G02B 21/367
(Continued)

(56) References Cited

U.S. PATENT DOCUMENTS 6,075,905 A   6/2000 Herman et al.
2009/0175558 A1* 7/2009 Moriya ................. H04N 1/387
                                                      382/279
(Continued)

FOREIGN PATENT DOCUMENTS

JP   H11-095125 A   4/1999
JP   2002-514359 A  5/2002
(Continued)

OTHER PUBLICATIONS

Burt, P.J. et al., "Enhanced Image Capture Through Fusion", Computer Vision, 1993. Proceedings., Fourth International Conference on Berlin, Germany, May 11-14, 1993, Los Alamitos, CA, USA, IEEE Computer Soci., May 11, 1993, pp. 173-182.
(Continued)

*Primary Examiner* — Jeffrey A Williams
(74) *Attorney, Agent, or Firm* — Scully, Scott, Murphy & Presser, P.C.

(57) ABSTRACT

Provided is an image-acquisition apparatus that includes: a stage on which a specimen is mounted; an objective lens that collects light from the specimen mounted on the stage; a motor that drives the stage in the direction intersecting an optical axis of the objective lens; an imaging device that acquires images by capturing the light collected by the objective lens; and a processor comprising hardware, wherein the processor is configured to implement: a deterioration-level calculation unit configured to calculate deterioration levels contained in the acquired images; and an image generating unit configured to generate a pasted image by pasting the acquired images, wherein the image generating unit is configured to generate the pasted image by combining, for a common region of two images that are mutually pasted, an image with lower deterioration level calculated by the deterioration-level calculation unit at a higher combining ratio.

2 Claims, 5 Drawing Sheets

(51) Int. Cl.
  *G02B 21/36* (2006.01)
  *G06T 7/246* (2017.01)
  *G06T 11/60* (2006.01)
  *H04N 5/225* (2006.01)
  *G06K 9/03* (2006.01)
  *G06T 3/40* (2006.01)
  *G06T 5/50* (2006.01)
  *H04N 5/232* (2006.01)

(52) U.S. Cl.
  CPC ............ *G06K 9/036* (2013.01); *G06T 3/4038* (2013.01); *G06T 5/50* (2013.01); *G06T 7/248* (2017.01); *G06T 11/60* (2013.01); *H04N 5/2259* (2013.01); *H04N 5/23254* (2013.01); *H04N 5/23267* (2013.01); *G06T 2207/10056* (2013.01); *G06T 2207/20221* (2013.01); *H04N 5/23293* (2013.01)

(58) Field of Classification Search
  USPC .......................................................... 348/79
  See application file for complete search history.

(56) References Cited

U.S. PATENT DOCUMENTS

| | | | |
|---|---|---|---|
| 2011/0193980 A1* | 8/2011 | Ogasawara | H04N 1/387 348/220.1 |
| 2011/0249910 A1 | 10/2011 | Henderson et al. | |
| 2015/0241686 A1* | 8/2015 | Abe | G02B 21/367 348/79 |

FOREIGN PATENT DOCUMENTS

| | | |
|---|---|---|
| JP | 2013-524369 A | 6/2013 |
| JP | 2014-115609 A | 6/2014 |
| WO | 98/02844 A1 | 1/1998 |
| WO | WO 2011/127361 A2 | 10/2011 |
| WO | 2014/077001 A1 | 5/2014 |

OTHER PUBLICATIONS

Extended European Search Report dated Oct. 13, 2017 in European Patent Application No. 17 16 7061.5.

\* cited by examiner

FIG. 2
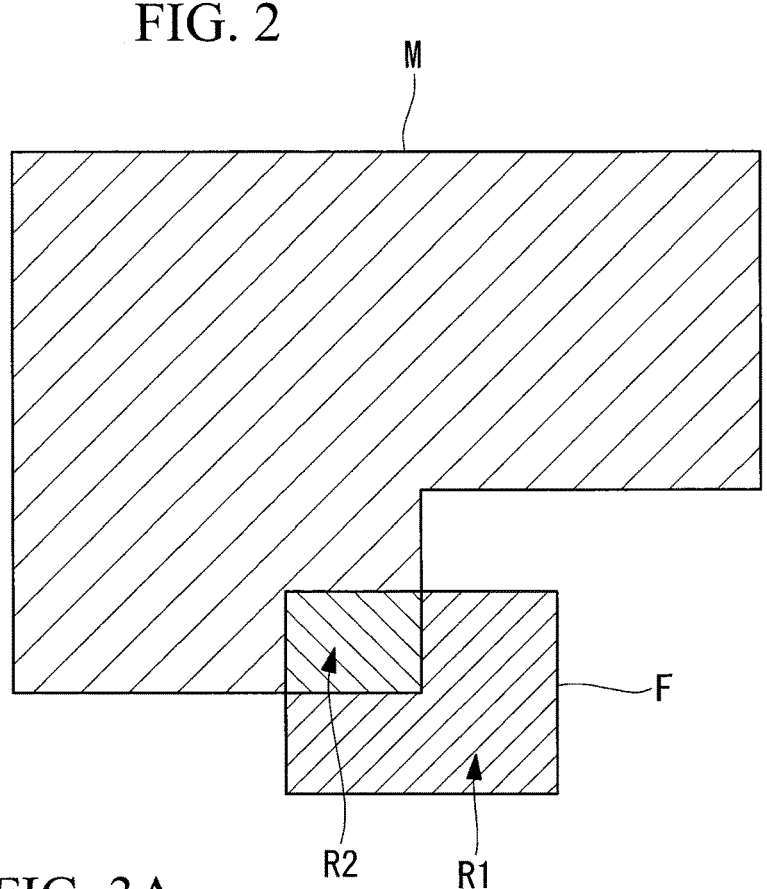
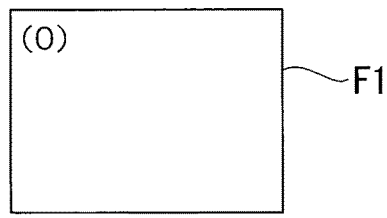
FIG. 3A
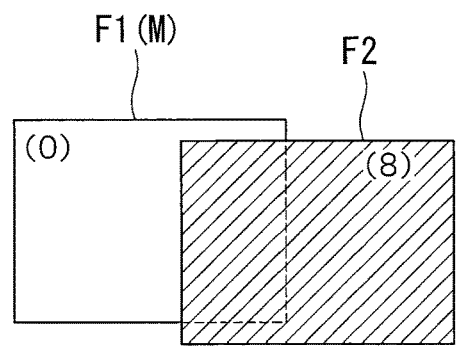
FIG. 3B
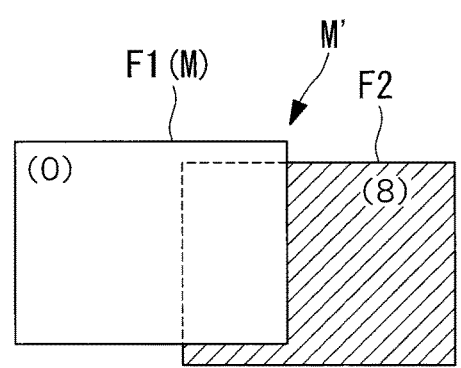
FIG. 3C

IMAGE-ACQUISITION APPARATUS

CROSS-REFERENCE TO RELATED APPLICATIONS

This application claims the benefit of Japanese Patent Application No. 2016-096660, the content of which is incorporated herein by reference.

TECHNICAL FIELD

The present invention relates to an image-acquisition apparatus.

BACKGROUND ART

In the related art, there is a known microscope that generates an image with a wide angle of view by capturing images of a specimen while moving an observation viewing field by moving a stage, on which the specimen is mounted, and by successively pasting the acquired images (for example, see PTL 1.

In PTL 1, when images having motion blurring due to the movement of the stage or distortion caused by defocusing due to surface roughness of the specimen are pasted, in order to prevent deterioration of the quality of the pasted image thus generated, image restoration processing is carried out by obtaining deterioration information that indicates deterioration caused in the acquired images and by restoring the images on the basis of the obtained deterioration information.

CITATION LIST

Patent Literature

{PTL 1} Japanese Unexamined Patent Application, Publication No. 2014-115609

SUMMARY OF INVENTION

One aspect of the present invention is an image-acquisition apparatus including: a stage on which a specimen is mounted; an objective lens that collects light from the specimen mounted on the stage; a motor that drives the stage in a direction intersecting an optical axis of the objective lens; an imaging device that acquires images by capturing the light collected by the objective lens; and a processor comprising hardware, wherein the processor is configured to implement: a deterioration-level calculation unit configured to calculate deterioration levels contained in the images acquired by the imaging device; and an image generating unit configured to generate a pasted image by pasting the images acquired by the imaging device; wherein the image generating unit is configured to generate the pasted image by combining, for a common region of two images that are mutually pasted, an image with lower deterioration level calculated by the deterioration-level calculation unit at a higher combining ratio.

BRIEF DESCRIPTION OF DRAWINGS

FIG. 2 is a diagram for explaining pasting processing of a pasted image and a frame image carried out by the image-acquisition apparatus in FIG. 1.

FIG. 3A is a diagram for explaining the pasting processing in which four frame images are successively pasted by the image-acquisition apparatus in FIG. 1.

FIG. 3B is a diagram for explaining the pasting processing in which four frame images are successively pasted by the image-acquisition apparatus in FIG. 1.

FIG. 3C is a diagram for explaining the pasting processing in which four frame images are successively pasted by the image-acquisition apparatus in FIG. 1.

DESCRIPTION OF EMBODIMENT

An image-acquisition apparatus 1 according to an embodiment of the present invention will be described below with reference to the drawings.

Figure 1:
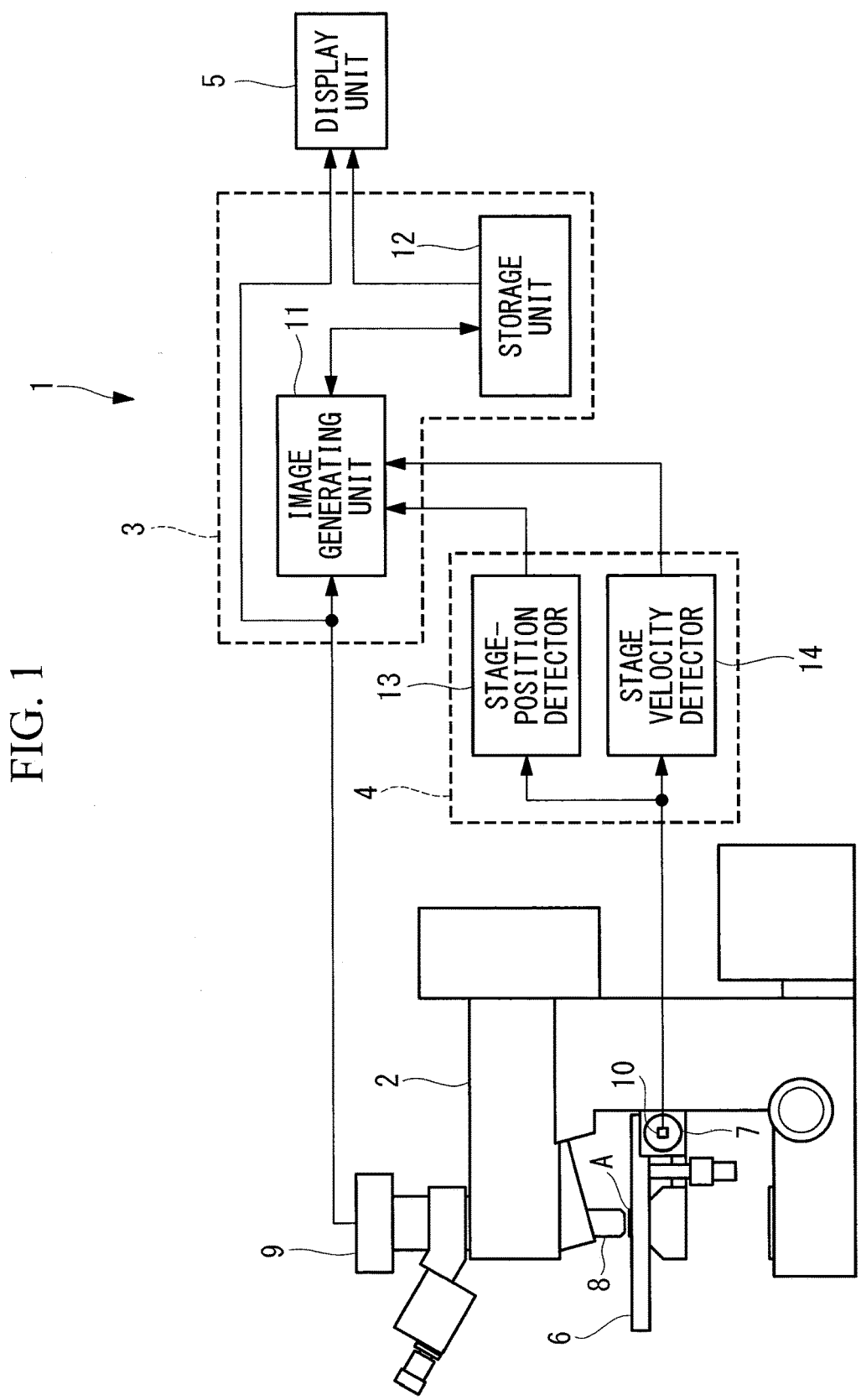
FIG. 1 is an overall configuration diagram showing an image-acquisition apparatus according to one embodiment of the present invention.

As shown in FIG. 1, the image-acquisition apparatus 1 according to this embodiment is a microscope apparatus and has a microscope main unit 2, a computing unit 3, a microscope interface unit 4, and a display unit 5.

The microscope main unit 2 has a stage 6 on which a specimen A is to be mounted, a motor (a stage driving unit) 7 that moves the stage 6 in three dimensional directions, an objective lens 8 that is arranged vertically above the specimen A mounted on the stage 6, and an image capturing unit 9 that captures the light from the specimen A, which is collected by the objective lens 8. The motor 7 has an encoder 10 that detects the position of the stage 6.

The image capturing unit 9 is an imaging device capable of acquiring a color (RGB) image, such as, for example, a CCD, a CMOS device, or the like.

The image information acquired by the image capturing unit 9 is sent to the computing unit 3.

The computing unit 3 is a computing device using, for example, a general-purpose personal computer, a workstation, an embedded processor, or FPGA (Field Programmable Gate Array). The computing unit 3 has an image generating unit 11 that generates a pasted image and a storage unit 12 that stores the generated pasted image. The storage unit 12 can include an HDD, SSD, or the like.

The microscope interface unit 4 has a stage-position detector 13 that detects the positional information of the stage 6 from detection information that has been detected by the encoder 10 provided on the motor 7 and a stage velocity detector (a deterioration-level calculation unit or a velocity detector) 14 that detects the velocity information (deterioration level) of the stage 6. The detected positional information and the velocity information of the stage 6 are sent to the image generating unit 11 of the computing unit 3. Here, the velocity information indicates that the larger the value is, the greater the velocity becomes and the greater the deterioration level becomes.

The storage unit 12 stores, in association with each other, a pixel value M(x,y) at coordinates (x,y) and velocity information V(x,y) of the stage 6 detected by the stage velocity detector 14.

The display unit 5 is, for example, a liquid crystal display that displays a live image that is acquired by the image capturing unit 9 and the pasted image that has been stored in the storage unit 12.

The image generating unit 11 carries out pasting processing in which the live image that has been acquired by the image capturing unit 9 and the pasted image that is stored in the storage unit 12 are pasted together.

As shown in FIG. 2, for a region R1 where a pasted image does not exist, the image generating unit 11 pastes the image acquired by the image capturing unit 9 (hereinafter referred to as "frame image F") without carrying out any processing and sets velocity information Vf that has been sent from the stage velocity detector 14 as the velocity information V(x,y).

In addition, in a common region R2 between a pasted image M and a frame image F, the image generating unit 11 generates a new pasted image M' and velocity information V'(x,y) according to the following equations (1).

$$M'(x,y)=F(x,y)(Vf<V(x,y))$$

$$M'(x,y)=M(x,y)(Vf\geq V(x,y))$$

$$V'(x,y)=Vf(Vf<V(x,y))$$

$$V'(x,y)=V(x,y)(Vf\geq(x,y)) \quad (1)$$

In other words, in the common region between the pasted image M and the frame image F, the pixel F(x,y) of the frame image F is selected if the velocity information Vf of the stage 6 that has been sent from the stage velocity detector 14 is smaller than the velocity information V(x,y) of each pixel M(x,y) in the pasted image M, and the pixel M(x,y) of the pasted image M is selected if the velocity information Vf of the stage 6 is equal to or greater than the velocity information V(x,y) of each pixel M(x,y) in the pasted image M.

A case in which the pasted image M is generated from four frame images F by using the image-acquisition apparatus 1 according to this embodiment as described above will be described.

As shown in FIG. 3A, when the pasted image M does not exist, a first frame image F1 is stored in the storage unit 12 as the pasted image M together with the velocity information V(x,y).

Next, as shown in FIG. 3B, when a second frame image F2 is acquired, the pasted image M stored in the storage unit 12 is read out, and the second frame image F2 is pasted such that a part thereof is superimposed in the common region. In this case, the velocity information of each image is respectively compared, and the image with the velocity information having a smaller value is selected as the image for the common region. In this case, as shown in FIG. 3C, the velocity information for the overall pasted image M is "0", and the velocity information of the second frame image F2 is "8", and so, the pasted image M with the velocity information having a smaller value is selected as the image for the common region. The thus-generated image M', which is shown in FIG. 3C, is stored in the storage unit 12 as the pasted image M.

Figure 3D:
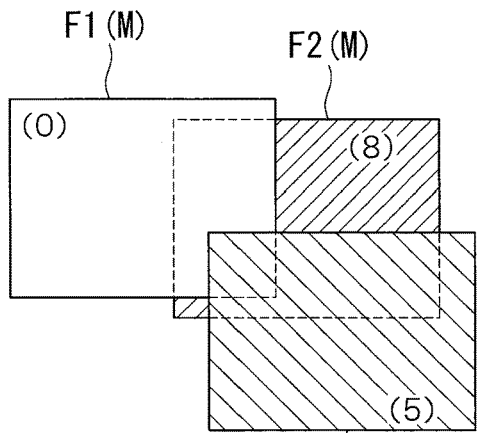
FIG. 3D is a diagram for explaining the pasting processing in which four frame images are successively pasted by the image-acquisition apparatus in FIG. 1.

Next, as shown in FIG. 3D, when a third frame image F3 is acquired, the pasted image M stored in the storage unit 12 is read out, and the third frame image F3 is pasted such that a part thereof is superimposed in the common region. In this case, the velocity information of each image is respectively compared for every pixel, and the image with the velocity information having the smaller value is selected as the image for the common region.

Figure 3E:
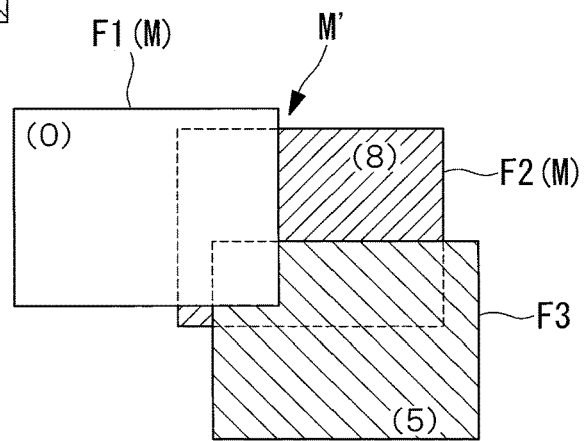
FIG. 3E is a diagram for explaining the pasting processing in which four frame images are successively pasted by the image-acquisition apparatus in FIG. 1.

In this case, as shown in FIG. 3E, with regard to the common region between the third frame image F3 and the first frame image F1 of the pasted image, the velocity information of the first frame image F1 is "0" and the velocity information of the third frame image F3 is "5", and so, the first frame image F1 with the velocity information having a smaller value is selected as the image for the common region. In addition, with regard to the common region between the third frame image F3 and the second frame image F2 of the pasted image M, the velocity information of the second frame image F2 is "8" and the velocity information of the third frame image F3 is "5", and so, the third frame image F3 with the velocity information having smaller value is selected as the image for the common region. The thus-generated image M', which is shown in FIG. 3(e), is stored in the storage unit 12 as the pasted image M.

Figure 3F:
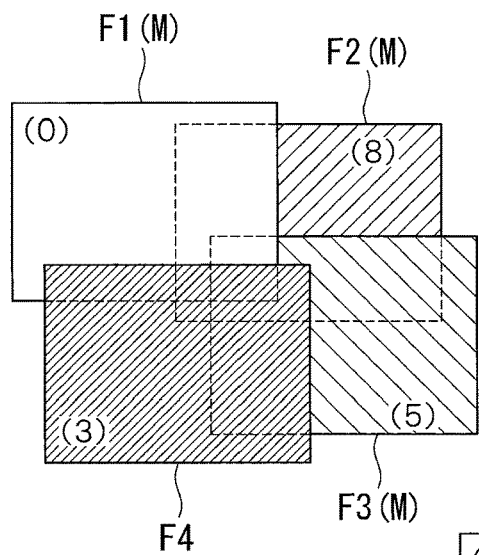
FIG. 3F is a diagram for explaining the pasting processing in which four frame images are successively pasted by the image-acquisition apparatus in FIG. 1.

Furthermore, as shown in FIG. 3F, when a fourth frame image F4 is acquired, the pasted image M stored in the storage unit 12 is read out, and the fourth frame image F4 is pasted such that a part thereof is superimposed in the common region. In this case, the velocity information of each image is respectively compared for every pixel, and the image with the velocity information having a smaller value is selected as the image for the common region.

Figure 3G:
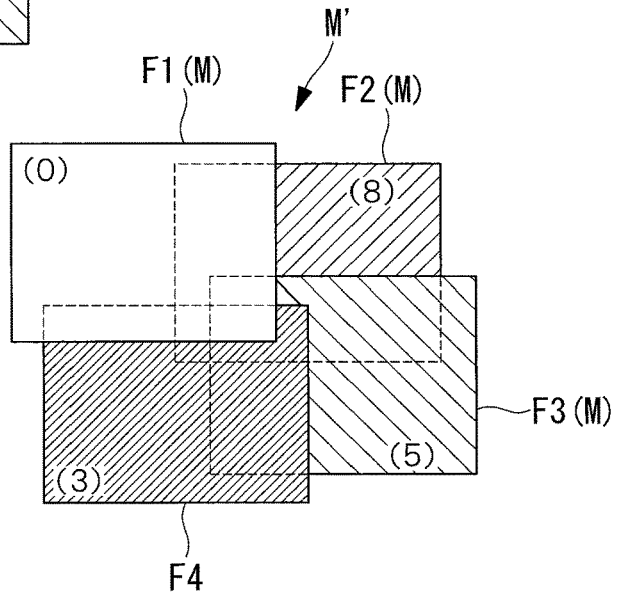
FIG. 3G is a diagram for explaining the pasting processing in which four frame images are successively pasted by the image-acquisition apparatus in FIG. 1.

In this case, as shown in FIG. 3G, with regard to the common region between the fourth frame image F4 and the first frame image F1 of the pasted image M, the velocity information of the first frame image F1 is "0" and the velocity information of the fourth frame image F4 is "3", and so, the first frame image F1 with the velocity information having a smaller value is selected as the image for the common region. In addition, with regard to the common region between the fourth frame image F4 and the second frame image F2 of the pasted image M, the velocity information of the second frame image F2 is "8" and the velocity information of the fourth frame image F4 is "3", and so, the fourth frame image F4 with the velocity information having a smaller value is selected as the image for the common region. Furthermore, with regard to the common region between the fourth frame image F4 and the third frame image F3 of the pasted image M, the velocity information of the fourth frame image F4 is "3" and the velocity information of the third frame image F3 is "5", and so, the fourth frame image F4 with the velocity information having a smaller value is selected as the image for the common region. The thus-generated image M', which is shown in FIG. 3G, is stored in the storage unit 12 as the pasted image M.

As described above, with the image-acquisition apparatus 1 according to this embodiment, by using the velocity information, it is determined whether or not the common region between the pasted image M and the frame image F is replaced with the frame image F in pixel units, and thereby, when a plurality of images are captured for the same part, the pasted image M can be generated by employing the image information with the lowest velocity, in other words, with the least motion blurring and deterioration. By doing so, an advantage is afforded in that it is possible to generate the pasted image M with less motion blurring.

The determination whether or not a partial region of the pasted image M is replaced with the frame image F can be carried out with a small amount of calculation, which affords an advantage in that it is possible to improve the quality of the pasted image M while satisfying the requirement for the real-time responsiveness by greatly reducing the time required for generating the pasted image M.

In this embodiment, although the velocity information is obtained by using the encoder 10 and is used as the deterioration level of the image, instead of this configuration, the velocity information of the stage 6 may be obtained from the acquired image.

Figure 4:
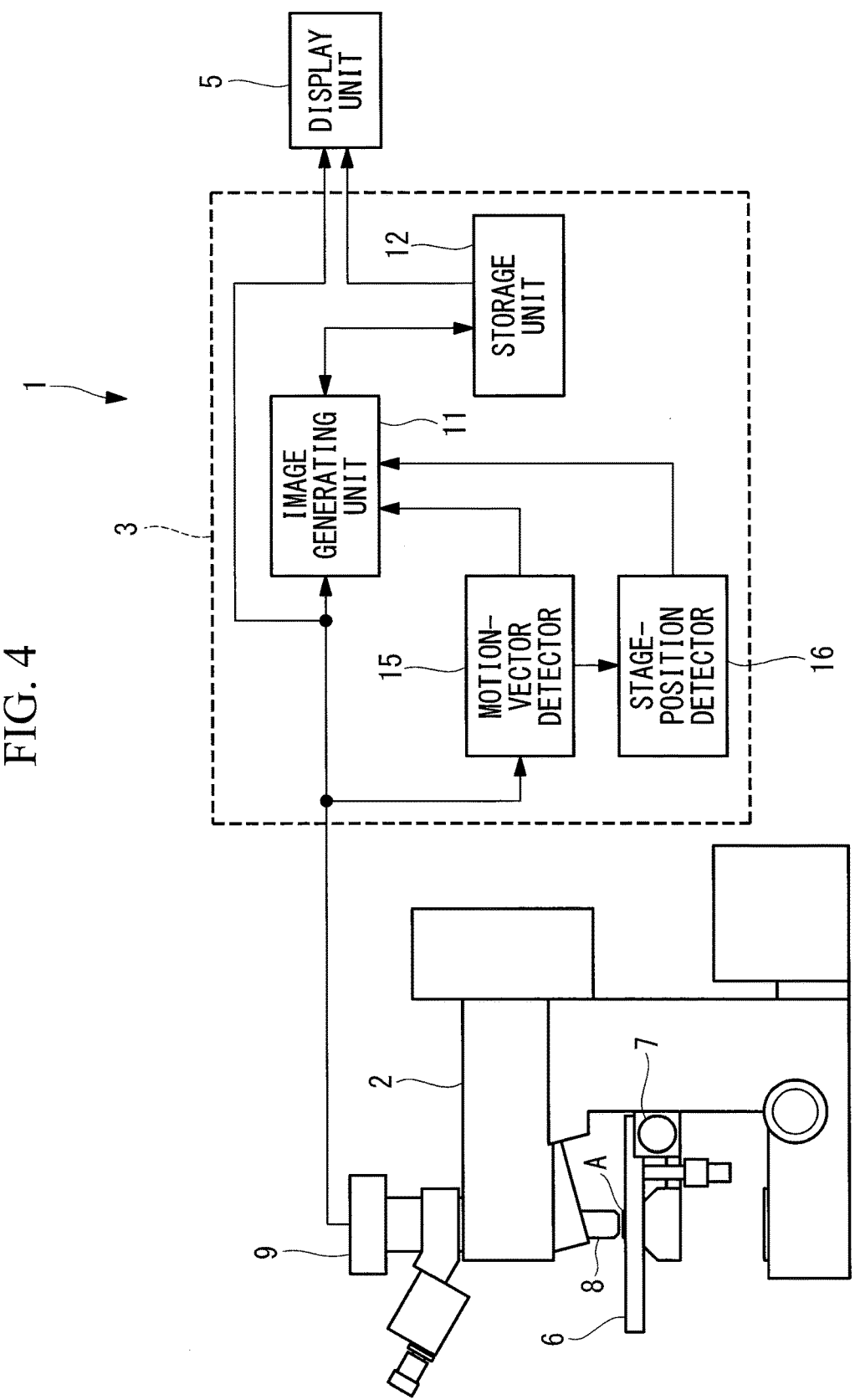
FIG. 4 is an overall configuration diagram showing a first modification of the image-acquisition apparatus in FIG. 1.

In other words, as shown in FIG. 4, a motion-vector detector (deterioration-level calculation unit) 15 is provided in the computing unit 3, and the motion vector is calculated by using the positional deviation between the frame image F acquired by the image capturing unit 9 and the frame image F that has been acquired in the preceding frame.

The motion vector may be detected by utilizing a known technique such as a template matching, as typified by SAD (Sum of Absolute Difference), NCC (Normalized Cross-Correlation), or the like, a phase-only correlation method based on the correlation of spatial frequencies, or the like.

Because the detected motion vector represents motion of an icon in the image, the motion vector corresponds to the moving velocity of the stage 6.

In addition, a stage-position detector 16 that detects the stage position by integrating the motion vector detected by the motion-vector detector 15 for every frame may be provided.

By doing so, even when the stage 6 that is moved manually is provided, an advantage is afforded in that it is possible to acquire the high-image quality pasted image M with a simple calculation without additionally providing a device such as the encoder 10 etc.

In addition, although the velocity information is used as the deterioration level of the image, instead of this configuration, the deterioration information may be calculated on the basis of the amount of the high-frequency component of the spatial frequency of the acquired image.

Figure 5:
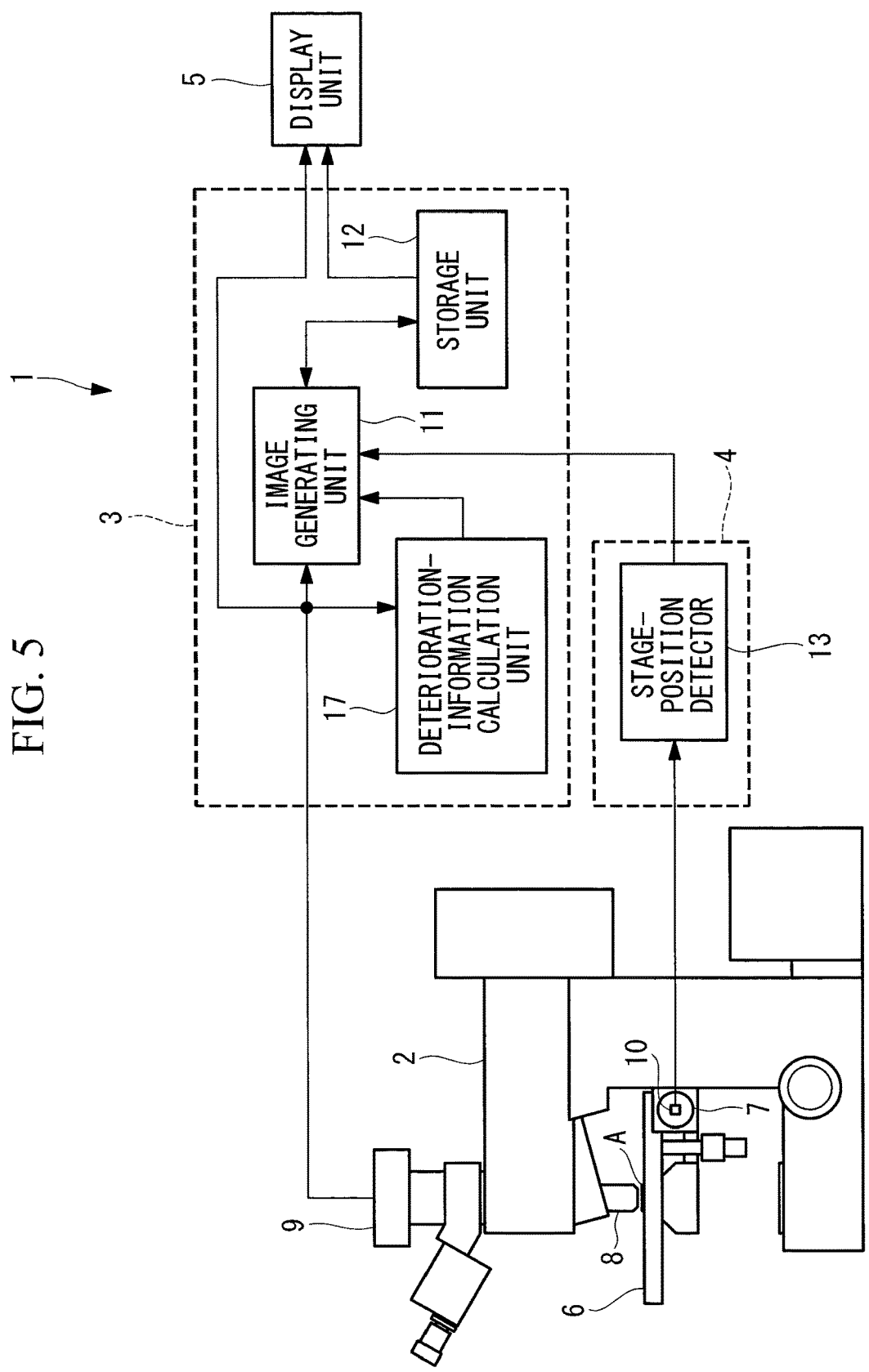
FIG. 5 is an overall configuration diagram showing a second modification of the image-acquisition apparatus in FIG. 1.

In other words, as shown in FIG. 5, a deterioration-information calculation unit (deterioration-level calculation unit) 17 that calculates the deterioration information of the frame image F by extracting the components in the medium to high-frequency region portion of the spatial frequency is provided in the computing unit 3, and the calculated deterioration information is sent to the image generating unit 11.

Specifically, for the frame image F, the deterioration-information calculation unit 17 carries out a known FIR spatial filtering processing, such as Laplacian, Sobel, Prewitt, or the like, and calculates the sum of absolute values of the image data as the deterioration information Bf after the filtering processing.

In the image generating unit 11, the pasted image M may be generated by using equation (2) instead of equation (1).

$$M'(x,y)=F(x,y)(B(x,y)<Bf)$$

$$M'(x,y)=M(x,y)(B(x,y)\geq Bf)$$

$$V'(x,y)=Vf(B(x,y)<Bf)$$

$$V'(x,y)=V(x,y)(B(x,y)\geq Bf) \quad (2)$$

Here, B(x,y) is the deterioration information for each pixel M(x,y) of the pasted image M.

When motion blurring or the distortion due to defocusing occurs, because the component in a medium to high-frequency region portion of the spatial frequency is generally decreased (in other words, the value of the deterioration information Bf is decreased), by selecting the pixel at which the value of the deterioration information is high, in other words, the pixel with a low deterioration level, it is possible to acquire, the pasted image with less motion blurring or less distortion due to defocusing.

By doing so, it is possible to generate the pasted image M with which the distortion due to defocusing is reduced in addition to the reduced motion blurring due to the movement of the stage 6.

In addition, the stage position may be detected from the image instead of using the stage-position detector 13 provided in the microscope interface unit 4.

In addition, in this embodiment, with regard to the common region between the pasted image M and the frame image F, although both images M and F are compared for every pixel and the image with lower deterioration level is selected as the image for the common region, instead of this, combination may be carried out by increasing a combining ratio of the image with lower deterioration level. For example, with regard to the common region between the pasted image M and the frame image F, when the pixel value at coordinates (x,y) of the pasted image M is M(x,y), the pixel value at coordinates (x,y) of the frame image F is F(x,y), the velocity information (deterioration information) of the pasted image M is Vm, and the velocity information of the frame image F is Vf, a new pasted image M' may be generated such that, the image with the velocity information having a smaller value, in other words, the image with lower deterioration level, is combined at a higher combining ratio by performing weighted addition using the velocity information as expressed in equation (3).

$$M'(x,y)=(1-\alpha)*M(x,y)+\alpha*F(x,y)$$

$$\text{wherein } \alpha=Vm/(Vm+Vf). \quad (3)$$

From the above-described embodiment, the following invention is derived.

One aspect of the present invention is an image-acquisition apparatus including: a stage on which a specimen is mounted; an objective lens that collects light from the specimen mounted on the stage; a stage driving unit that drives the stage in a direction intersecting an optical axis of the objective lens; an image capturing unit that acquires images by capturing the light collected by the objective lens; a deterioration-level calculation unit that calculates deterioration levels contained in the images acquired by the image capturing unit; and an image generating unit that generates a pasted image by pasting the images acquired by the image capturing unit; wherein the image generating unit generates the pasted image by combining, for a common region of two images that are mutually pasted, an image with lower deterioration level calculated by the deterioration-level calculation unit at a higher combining ratio.

According to this aspect, the specimen is mounted on the stage and images are acquired by the image capturing unit, at respective positions, while moving the specimen in the direction intersecting the optical axis of the objective lens by operating the stage driving unit, and the deterioration levels contained in the acquired images are calculated by the deterioration-level calculation unit. The image generating unit generates the pasted image by combining, for the common region of two images that are mutually pasted, the image with lower deterioration level at a higher combining ratio.

In other words, because the images are combined such that, for the common region of two images that are mutually pasted, the combined image contains more of the image with lower degree of deterioration, an amount of calculation required is not as much as that required for image restoration processing, and it is possible to generate, in a short period of time, a pasted image with reduced blurring and distortion with a small amount of calculation.

In the above-mentioned aspect, the image generating unit may select an image with a lower deterioration level calculated by the deterioration-level calculation unit.

By doing so, because the deterioration levels of two images are compared and the image with lower deterioration level is selected, it is possible to reduce the amount of calculation.

In addition, in the above-mentioned aspect, a velocity detector that detects a moving velocity of the stage moved by the stage driving unit may further be included, and the deterioration-level calculation unit may calculate larger deterioration level as the moving velocity detected by the velocity detector is greater.

By doing so, it is possible to use the moving velocity of the stage detected by the velocity detector as the deterioration level, to calculate the deterioration level with ease, and to further reduce the amount of calculation.

In addition, in the above-mentioned aspect, the velocity detector may calculate the moving velocity on the basis of relative positions of images acquired by the image capturing unit at different times.

By doing so, even when the stage is moved manually, it is possible to calculate the deterioration level with ease and to further reduce the amount of calculation without additionally providing a device such as an encoder etc.

In addition, in the above-mentioned aspect, the deterioration-level calculation unit may calculate lower deterioration level as a high-frequency component of the spatial frequency of the image acquired by the image capturing unit is greater.

When motion blurring and distortion due to defocusing occur, because the high-frequency component of the spatial frequency of the image is decreased, by calculating the deterioration level so as to become lower when the high-frequency component is greater, it is possible to easily generate the pasted image with reduced motion blurring and distortion due to defocusing.

REFERENCE SIGNS LIST 1 image-acquisition apparatus
6 stage
7 motor (stage driving unit)
8 objective lens
9 image capturing unit
11 image generating unit
14 stage velocity detector (deterioration-level calculation unit, velocity detector)
15 motion-vector detector (deterioration-level calculation unit)
17 deterioration-information calculation unit (deterioration-level calculation unit)
A specimen

The invention claimed is:

1. An image-acquisition apparatus comprising:
a stage on which a specimen is mounted;
an objective lens that collects light from the specimen mounted on the stage;
a motor that drives the stage in a direction intersecting an optical axis of the objective lens;
an imaging device that acquires images by capturing the light collected by the objective lens; and
a processor comprising hardware, wherein the processor is configured to:
determine velocity information (Vf) of the stage moved by the motor;
control a storage to store the velocity information (Vf) in association with a pixel value (F(x,y), M(x,y), M'(x,y)) at coordinates (x,y) of the images as velocity information (V(x,y)); and
generate a pasted image (M, M') by pasting the images acquired by the imaging device, wherein generating the pasted image comprises generating, in a common region (R2) between the pasted image (M) and a newly acquired image (F), the pixel value (M'(x,y)) of the new pasted image (M') and the velocity information (V'(x,y)) according to the following equations (1)

$$M'(x,y)=F(x,y)(Vf<V(x,y))$$

$$M'(x,y)=M(x,y)(Vf\geq V(x,y))$$

$$V'(x,y)=Vf(Vf<V(x,y))$$

$$V'(x,y)=V(x,y)(Vf\geq V(x,y)) \qquad (1).$$

2. The image-acquisition apparatus according to claim 1, wherein the processor is configured to calculate the velocity information (VF) of the stage on the basis of relative positions of images acquired by the imaging device at different times.

* * * * *